United States Patent Office 3,763,230
Patented Oct. 2, 1973

3,763,230
SULFONIUM COMPOUNDS OF α-HYDROXY-γ-ALKYLMERCAPTOBUTYRIC ACID
Hans Wagner, Konstanz, and Herbert Tanner, Grossauheim, Germany, assignors to Deutsche Gold- und Silber-Scheideanstalt vormals Roessler, Frankfurt am Main, Germany
No Drawing. Filed Aug. 13, 1971, Ser. No. 171,775
Int. Cl. C07c 59/04
U.S. Cl. 260—535 R                 9 Claims

ABSTRACT OF THE DISCLOSURE

Compounds of the General Formula I

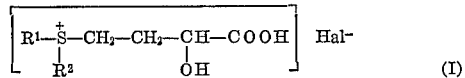

in which $R^1$ is an alkyl radical having 1 to 12 carbon atoms, an aralkyl or an aryl radical, $R^2$ is an alkyl radical having 1 to 4 carbon atoms and Hal is a halogen atom. A process for preparing those compounds is provided. The compounds are biologically active and constitute valuable drugs.

---

This invention relates to new compounds of α-hydroxy-γ-alkylmercaptobutyric acid as well as to a process for their preparation.

It is known that methionine methylsulfonium compounds can be prepared by converting methionine with dimethyl sulfate in concentrated sulfuric acid into methionine methylsulfonium sulfate. The excess sulfuric acid is then separated with barium chloride as barium sulfate (Japanese patent applications No. 9,068/62, 9,465/62 and 7,314/62). Furthermore, it is known that methionine methylsulfonium chloride or bromide can be prepared by reacting methionine with methyl chloride or bromide in the presence of a solvent at high temperature, possibly under pressure (German DAS No. 1,239,697).

On the other hand, γ-alkylthiohydroxy butyric acids, which are also sulfonium compounds, have not as yet been described.

The invention relates to compounds of the general formula

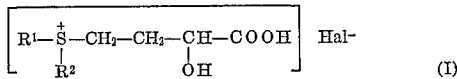

in which $R^1$ is an alkyl radical having 1 to 12 carbon atoms, an aralkyl or an aryl radical, $R^2$ is an alkyl radical having 1 to 4 carbon atoms and Hal stands for a halogen atom, preferably a chlorine atom. Preferably, $R^1$ and $R^2$ are methyl radicals.

The compounds of the invention can be used as additives to feed mixtures. They are biologically active and constitute valuable drugs, for example, for the treatment of stomach or intestinel ulcers.

The compounds of this invention can be prepared by reacting an α-hydroxy-γ-alkylmercaptobutyric acid in the presence of water at a temperature between about 10 and 100° C. with a compound of the general formula $R^2Hal$ (II), in which $R^2$ and Hal have the meanings indicated in Formula I.

The quantitative ratio of acid to alkyl-halide can vary over a wide range. Preferably, the halide is used in excess. It is particularly preferred that the molar relationship of the acid to the halide is about 1:1.5 to 1:3.

Preferably the reaction is effected at temperatures between about 30° and 80°. Temperatures below 10° C. can be used, but in general higher temperatures are used because of a higher rate of reaction at the high temperature. If necessary the process is effected at elevated pressure.

For workup of the reaction product, the water is distilled off under vacuum, and the sulfonium compound is isolated by means of alcohols that are miscible with water, especially methanol, ethanol or isopropanol.

It has further been found that as a starting material there may also be used the product of hydrolysis of an α-hydroxy-γ-alkylmercapto-butyro-nitrile with an aqueous inorganic acid, for example sulfuric acid, after neutralizing the excess inorganic acid. Thus, in a simple way and in good yield, compounds of this invention can be prepared directly from β-alkylmercapto-propionaldehyde and hydrogen cyanide, as well as a compound of the general formula $R^2Hal$ (II), without separation of intermediate products.

The hydrolysis of such nitriles is known. It occurs, for example, in the use of 0.5 to 0.8 mole sulfuric acid per mole nitrile. Higher fractions of sulfuric acid can be used, of course, but there is no advantage in general through this procedure. Neutralization of the excess inorganic acids in the product of hydrolysis can be effected with ammonia or with hydroxides or carbonates of alkali or alkaline earth metals.

Because of the presence of inorganic salts as a result of the neutralization, it is preferred that evaporation of the water be conducted so that in the crystal slurry there will be attained a water content of about 5 to 10%, in order that in the subsequent treatment with an alcohol there will be no esterification and the inorganic salts will not penetrate into the alcohol phase. If necessary, the inorganic salts can be removed immediately after the neutralization; they remain as residues if water is removed from the neutralized mixture and can be withdrawn with organic solvents such as chloralkanes.

This invention will be more clearly understood by reference to the following examples in which all parts, proportions and percentages are by weight unless otherwise indicated.

EXAMPLE 1

104 g. β-methylmercapto-propionaldehyde are reacted with 29 g. liquid hydrogen cyanide with agitation and cooling to 20 to 22° C. 0.2 ml. of a 40% aqueous trimethylamine solution are used as catalyst. The α-hydroxy-γ-methylmercaptobutyronitrile obtained is treated with 74 g. of an approximately 75% sulfuric acid first at 30° C. and then for 3 to 4 hours at 45° C. After addition of 175 ml. water, there is boiling with reflux for 2½ hours and about 25 ml. water are distilled off together with volatile impurities. The excess sulfuric acid is neutralized with ammonia. Finally, the hydrolysis mixture diluted with 500 ml. water is placed in a pressurized agitator vessel made of V4A steel with 3 liters volume and the mixture, after forcing in of 150 g. methyl chloride is held for 7 hours with agitation at 50 to 55° C. The pressure rises to 13 to 14 atmospheres. After cooling to 15 to 20° C., the excess methyl chloride is allowed to escape. The yellowish-brown colored reaction mixture is treated with 0.5% active charcoal. The active charcoal is filtered off, and under vacuum water is distilled at 40 to 50° C. until a crystal slurry remains which contains maximally 10% water. The crystal slurry is treated with 500 ml. methanol at boiling temperature. The undissolved remaining ammonium sulfate is filtered off and washed with 75 ml. methanol. From the filtrate there crystallizes within 24 hours at −5° to −10° C. the major portion of the α-hydroxy-γ-methylmercaptobutyric - acid - methylsulfonium chloride. After concentration of the mother liquor and corresponding treatment of the residue, there is obtained a second crystalline product of the same quality. On the whole, 173 g. are obtained corresponding to 85.5% calculated on β-methylmercapto-propionaldehyde. The α-hydroxy-γ-methylmercaptobutyric acid - methylsulfonium chloride has a melting point of 140° C. and a purity of 99%. It contains no organic impurities that can be detected by chromatography.

Elementary analysis.—Found (percent): C, 35.6; H, 6.5; S, 15.8. Calculated as $C_6H_{13}O_3ClS$ (percent): C, 35.9; H, 6.5; S, 16.0.

In the same way, the methylsulfonium bromide or iodide of α-hydroxy-γ-methylmercaptobutyric acid can be prepared. The bromide has a melting point of 119 to 121° C. and according to Volhard's bromide determination it is 99%.

Elementary analysis of the bromide.—Found (percent): C, 29.2; H, 5.2; S, 12.8. Calculated as $C_6H_{13}O_3BrS$ (percent): C, 29.4; H, 5.3; S, 13.1.

The iodide collects as a viscous hygroscopic oil which, according to Volhard determination, is 98%. The elementary analysis of the iodide yields.

Found (percent): C, 24.1; H, 4.8; S, 10.9. Calculated as $C_6H_{13}O_3IS$ (percent): C, 24.6; H, 4.5; S, 10.9.

EXAMPLE 2

196 g. α-hydroxy-γ-methylmercaptobutyronitrile, which was prepared according to Example 1 from 156 g. β-methylmercapto-propionaldehyde, are hydrolyzed with aqueous sulfuric acid according to the procedure of Example 1. The excess sulfuric acid is then neutralized by addition of ammonia. The water which is present is evaporated under vacuum at 40° C., and the residue is taken up in 1,2-dichloroethane and filtered from the undissolved ammonium sulfate. The solvent is distilled off under vacuum and the residue is dissolved in 900 ml. water. For chloromethylation, the procedure is as described in Example 1. After otherwise identical workup, there is obtained as a whole 252 g. α-hydroxy-γ-methylmercaptobutyric acid-methylsulfonium chloride which corresponds to a yield of 83%, calculated on β-methylmercaptopropionaldehyde. The sulfonium compound has a purity of more than 99% and is chromatographically uniform.

EXAMPLE 3

153 g. of a 94% α-hydroxy-γ-methylmercaptobutyric acid, prepared from 104 g. β-methylmercapto-propionaldehyde and 29 g. anhydrous hydrogen cyanide according to Example 1 with admixture of ammonium sulfate and 1,2-dichloroethane is diluted with 600 ml. water. The mixture is placed in a pressurized agitator vessel made of V4A steel with 3 liters volume, and after forcing in of 150 g. methyl chloride it is held with agitation for 8 hours at 50° C. After cessation of the reaction, the product is allowed to cool to room temperature and the excess methyl chloride is removed by release of pressure. The further workup is as described in Examples 1 and 2. On the whole, 168 g. α-hydroxy-γ-methyl-mercaptobutyric acid-methylsulfonium chloride corresponding to a yield of 83% calculated on β - methylmercapto - propionaldehyde, is obtained.

What is claimed is:

1. Compound of the General Formula I

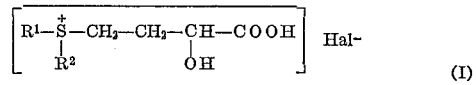

in which $R^1$ is an alkyl radical having 1 to 12 carbon atoms, an aralkyl or an aryl radical, $R^2$ is an alkyl radical having 1 to 4 carbon atoms and Hal is a halogen atom.

2. Compound of claim 1 in which Hal is chlorine.

3. α-Hydroxy-γ-methylmercapto-butyric acid - methylsulfonium chloride.

4. α-Hydroxy-γ-methylmercapto-butyric acid - methylsulfonium bromide.

5. α-Hydroxy-γ-methylmercapto-butyric acid - methylsulfonium iodide.

6. Process for the preparation of compounds according to General Formula I, consisting essentially of reacting an α-hydroxy-γ-alkylmercapto-butyric acid in the presence of water at a temperature between about 10° and 100° C. with a compound of the general formula $R^2Hal$ (II), in which $R^2$ and Hal have the meaning indicated in claim 1.

7. Process of claim 6, in which there is used as a starting material the product of hydrolysis of an α-hydroxy-γ-alkylmercapto-butyronitrile with an aqueous inorganic acid after neutralization of the excess inorganic acid without intermediate separation.

8. Process of claim 6 consisting essentially of reacting the α-hydroxy-γ-methylmercaptobutyric acid in the presence of water at temperatures of about 30 to about 80° C. with methyl chloride, methyl bromide or methyl iodide.

9. Process of claim 7 consisting essentially of reacting the α-hydroxy-γ-methylmercapto-butyric acid in the presence of water at temperatures of about 30° to about 80° C. with methyl chloride, methyl bromide or methyl iodide.

References Cited

UNITED STATES PATENTS

| | | |
|---|---|---|
| 2,938,053 | 5/1960 | Blake et al. _____ 260—535 S |
| 3,098,078 | 7/1963 | Druey et al. _____ 260—535 S |
| 3,159,682 | 12/1964 | Baird et al. _____ 260—535 S |

OTHER REFERENCES

Szmant: Organic Chemistry, 1957, p. 517.

LORRAINE A. WEINBERGER, Primary Examiner

P. J. KILLOS, Assistant Examiner

U.S. Cl. X.R.

260—465.6, 521 R; 424—317